(12) United States Patent
Despres et al.

(10) Patent No.: US 11,333,302 B2
(45) Date of Patent: May 17, 2022

(54) ADSORBENT-BASED, MECHANICALLY-REGULATED GAS STORAGE AND DELIVERY VESSEL

(71) Applicant: ENTEGRIS, INC., Billerica, MA (US)

(72) Inventors: Joseph Robert Despres, Middletown, CT (US); Joseph D. Sweeney, New Milford, CT (US); Edward A. Sturm, New Milford, CT (US)

(73) Assignee: ENTEGRIS, INC., Billerica, MA (US)

( * ) Notice: Subject to any disclaimer, the term of this patent is extended or adjusted under 35 U.S.C. 154(b) by 485 days.

(21) Appl. No.: 16/375,000

(22) Filed: Apr. 4, 2019

(65) Prior Publication Data

US 2020/0088352 A1 Mar. 19, 2020

Related U.S. Application Data

(60) Provisional application No. 62/730,754, filed on Sep. 13, 2018.

(51) Int. Cl.
*F17C 11/00* (2006.01)
*B01D 53/04* (2006.01)
*B01J 20/22* (2006.01)

(52) U.S. Cl.
CPC .............. *F17C 11/00* (2013.01); *B01J 20/226* (2013.01); *B01D 2253/00* (2013.01); *F17C 2205/0338* (2013.01)

(58) Field of Classification Search
CPC ........... B01D 2253/00; B01D 2253/204; B01J 20/226; F17C 11/00; F17C 11/002; F17C 11/005; F17C 11/007; F17C 2205/0338

USPC ........................ 206/0.7; 95/900–903; 96/108
See application file for complete search history.

(56) References Cited

U.S. PATENT DOCUMENTS

| | | | |
|---|---|---|---|
| 6,019,823 A * | 2/2000 | Tischler | B01D 53/0415 206/0.7 |
| 6,660,063 B2 | 12/2003 | Tom | |
| 8,119,853 B2 | 2/2012 | Huang et al. | |
| 2011/0252962 A1* | 10/2011 | Von Helmolt | F17C 11/005 95/15 |
| 2015/0034500 A1* | 2/2015 | Kim | B01J 20/226 206/0.7 |
| 2015/0247605 A1* | 9/2015 | Despres | F17C 13/04 222/1 |
| 2016/0305682 A1* | 10/2016 | Olander | F24F 11/30 |
| 2016/0356425 A1* | 12/2016 | Fanger | B60K 15/03006 |
| 2017/0122496 A1 | 5/2017 | Scannell | |
| 2019/0277452 A1* | 9/2019 | Despres | F17C 11/00 |

FOREIGN PATENT DOCUMENTS

| | | |
|---|---|---|
| TW | 201418141 A | 5/2014 |
| TW | 201621206 A | 6/2016 |
| TW | 201704918 A | 2/2017 |
| WO | 9744118 A1 | 11/1997 |
| WO | WO 2016/130866 A1 * | 8/2016 |
| WO | 2017079550 A2 | 5/2017 |

* cited by examiner

*Primary Examiner* — Frank M Lawrence, Jr.
(74) *Attorney, Agent, or Firm* — Entegris, Inc.

(57) ABSTRACT

Described are storage and dispensing vessels and related systems and methods, for dispensing reagent gas from a vessel in which the reagent gas is held in sorptive relationship to a solid adsorbent medium, the reagent gas being contained at super-atmospheric pressure and the solid adsorbent medium comprising a metal-organic framework.

14 Claims, 7 Drawing Sheets

ADSORBENT-BASED, MECHANICALLY-REGULATED GAS STORAGE AND DELIVERY VESSEL

CROSS-REFERENCE TO RELATED APPLICATION

This application claims the benefit of U.S. Provisional Application No. 62/730,754 filed on Sep. 13, 2018, which is incorporated herein by reference in its entirety for all purposes.

FIELD

The disclosure relates generally to storage and dispensing systems, and related methods, for the selective dispensing of reagent gas from a vessel in which the reagent gas is held in sorptive relationship to a solid adsorbent medium.

BACKGROUND

Gaseous raw materials (referred to herein as "reagent gases") are used in a range of industries and industrial applications. Some examples of industrial applications include those used in processing semiconductor materials or microelectronic devices, such as: ion implantation, epitaxial growth, plasma etching, reactive ion etching, metallization, physical vapor deposition, chemical vapor deposition, atomic layer deposition, plasma deposition, photolithography, cleaning, and doping, among others, with these uses being included in methods for manufacturing semiconductor, microelectronic, photovoltaic, and flat-panel display devices and products, among others.

In the manufacture of semiconductor materials and devices, and in various other industrial processes and applications, there is a need for reliable sources of hydride and halide gases, as well as a wide variety of other process gases. Examples include silane, germane, ammonia, phosphine, arsine, diborane, stibine, hydrogen sulfide, hydrogen selenide, hydrogen telluride, and corresponding and other halide (chlorine, bromine, iodine, and fluorine) compounds. The gaseous hydrides arsine ($AsH_3$) and phosphine ($PH_3$) are commonly used as sources of arsenic (As) and phosphorous (P) in ion implantation. Due to their extreme toxicity and relatively high vapor pressure, the use, transportation, or storage of these gases raises significant safety concerns. These gases must be stored, transported, handled, and used with a high level of care and with many safety precautions.

A variety of different types of containers are used to contain, store, transport, and dispense these types of reagent gases. Some containers, referred to herein as "adsorbent-based containers," contain a gas using a porous adsorbent material included within the container, wherein the reagent gas is stored by being adsorbed onto the adsorbent material. The adsorbed reagent gas may be contained in the vessel in equilibrium with the reagent gas also present in condensed and/or gaseous form, and the interior of the vessel may be at, above, or below atmospheric pressure.

The gaseous raw material must be delivered in a concentrated or substantially pure form, and must be available in a packaged form that provides a reliable supply of the gas for efficient use of the gas in a manufacturing system. One feature of a packaged gaseous raw material is the amount of deliverable material that can be supplied from a product vessel. A higher amount of deliverable material in a vessel (a higher "deliverable gas capacity") improves the efficiency of using the vessel and its contained gaseous raw material in a manufacture process, because the vessel may be used for a longer period of time (relative to a vessel with a lower amount of deliverable material) without replacement; operating efficiency increases because the frequency of replacing a spent (e.g., empty) vessel with a new vessel is reduced. Adsorbent-based vessels can be effective to increase the deliverable gas capacity of a vessel.

SUMMARY

At present, a number of different types of adsorbent-based gas storage and delivery vessels are available commercially. Some products use adsorbent (e.g., carbon) and contain gas at sub-atmospheric pressure for storage and delivery of the gas at sub-atmospheric pressure. These are often referred to as Sub-Atmospheric Gas Storage vessels of type 1 (or SAGS-1). SAGS-1 vessels store and deliver gas at sub-atmospheric pressures.

Other Sub-Atmospheric Gas delivery products store gases at super-atmospheric pressure, and may include an internal pressure regulator to allow the reagent gas to be delivered from the vessel at a reduced pressure relative to the internal storage pressure, such as at a sub-atmospheric pressure. Such vessels may be classified as Sub-Atmospheric Gas Storage vessels of type 2 (or SAGS-2 containers). SAGS-2 vessels deliver gas at sub-atmospheric pressure but may contain or store it at super-atmospheric pressures. See U.S. Pat. No. 6,660,063. The following description relates to the use of a metal-organic framework (MOF) in an adsorbent-based storage vessel to store a reagent gas at super-atmospheric pressure. Applicant has determined that the use of a MOF as an adsorbent can allow for useful or preferred storage capabilities when a reagent gas is stored at a super-atmospheric pressure, especially at mid- to upper-pressure ranges. For example, the use of a MOF as an adsorbent to contain a reagent gas at certain middle-to-upper levels of super-atmospheric pressure can result in a vessel that exhibits a higher storage capacity (i.e., "deliverable capacity") at those elevated pressure levels, compared to the storage capacity at the same elevated pressure and for the same reagent gas of a comparable vessel that includes either no adsorbent or a non-MOF adsorbent (e.g., carbon or zeolite adsorbent); this is true even if the storage capacity of the MOF adsorbent is below that of the non-MOF adsorbent at a lower pressure. For purposes of this comparison, a "comparable" vessel can be one that includes the same container (e.g., pressurized cylinder) and the same amount by volume of adsorbent, except that the adsorbent is a zeolite or carbon-based adsorbent and not a MOF adsorbent. For this comparison, examples of a useful type of carbon-based adsorbent are the beaded activated carbon adsorbent used in the SDS2® Safe Delivery Source® products and the formed carbon adsorbent used in the SDS3® Safe Delivery Source® products, all commercially available from Entegris, Inc.

A vessel as described contains the MOF and reagent gas, with a portion of the reagent gas being adsorbed onto the MOF and another portion being in a condensed or gaseous form in equilibrium with the adsorbed portion. To deliver the gas from the vessel to a point of use at a pressure that is below the internal storage pressure, e.g., at a pressure that is sub-atmospheric (below 760 Torr), the vessel can be used with or may contain a pressure regulator, e.g., at the interior of the vessel, or a plurality of regulators (single stage or dual stage design).

In one aspect, the disclosure relates to a gas storage and dispensing vessel enclosing an interior volume for holding reagent gas. The vessel includes: a port; a valve mounted at the port; a pressure regulator arranged to maintain a predetermined pressure of reagent gas discharged from the vessel; and metal-organic framework adsorbent at the interior volume. The vessel is selectively actuatable to flow gas from the interior volume of the vessel, through the pressure regulator and the valve, for discharge of the reagent gas from the vessel.

In another aspect, the disclosure relates to a method of supplying reagent gas from a vessel as described. The method includes delivering the reagent gas (stored at super-atmospheric pressure) from the vessel interior, to a vessel exterior, at a pressure below 5200 Torr and preferably below 760 Torr.

DETAILED DESCRIPTION

Figure 1:
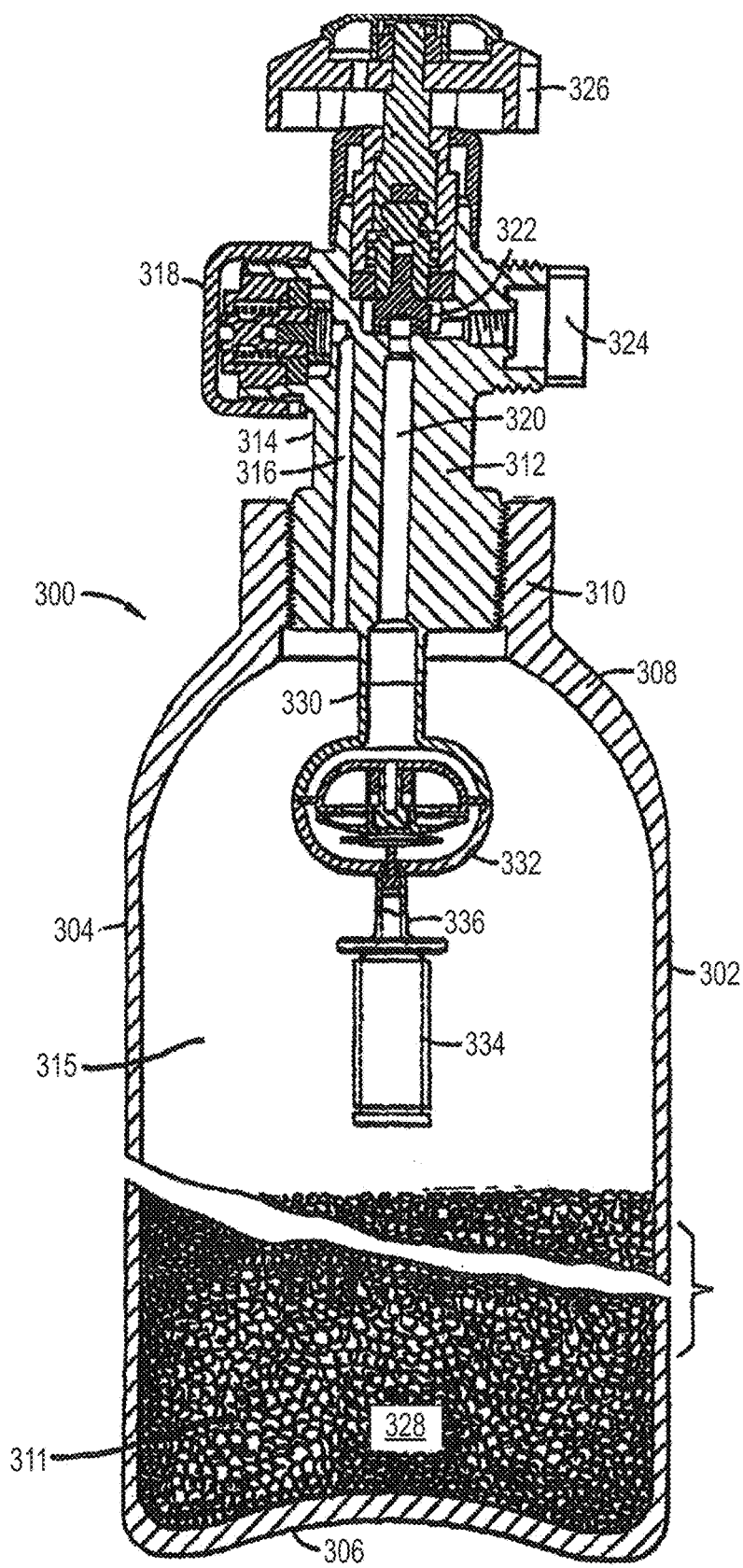
FIG. 1 shows an exemplary vessel in accordance with embodiments of the disclosure.

The present description relates to novel and inventive storage vessels and methods of using the storage vessels to transport, store, handle, and deliver reagent gas. The vessel includes adsorbent material that is at least partially comprised of a metal-organic framework (MOF). Reagent gas is present at the vessel interior with a portion of the reagent gas being adsorbed onto the MOF and another portion being in gaseous form or condensed and gaseous form and in equilibrium with the adsorbed portion. The pressure at the interior of the vessel is super-atmospheric. Examples of preferred vessels can exhibit a higher storage capacity compared to vessels and systems that use either no adsorbent or a non-MOF adsorbent such as a carbon or zeolite adsorbent, especially at moderate to high internal pressures that are within a range of pressures used with comparable pressurized reagent gas storage and delivery vessels.

The reagent gas, at super-atmospheric pressure within the vessel interior, can be delivered from the vessel at a reduced pressure, e.g., sub-atmospheric pressure, by passing the reagent gas through a pressure regulator when the reagent gas flows from the vessel. The vessel, therefore, optionally and preferably includes a pressure regulator (or plurality of pressure regulators) through which reagent gas must pass when flowing from the vessel interior to an exterior location at a point of use. The pressure regulator may be located at the interior of the vessel to allow the reagent gas to be dispensed from the pressurized vessel interior, to an exterior location, at a pressure (at delivery) that is reduced relative to the super-atmospheric pressure of the reagent gas contained at the vessel interior. Alternatively, the vessel may be mated with a pressure regulator located external to the vessel.

The vessel is an adsorbent-based storage vessel that includes metal-organic framework adsorption media. Metal-organic framework adsorption media are known, and differ from other types of adsorption media such as carbon-based adsorption media, polymeric adsorption media, zeolites, silica, etc. The vessel may contain MOF as the only type of adsorption media present at the vessel interior, or, if desired, may contain MOF in combination with another type of adsorption media such as carbon-based adsorption media, polymeric adsorption media, zeolites, silica, etc. In certain presently preferred embodiments, adsorption media contained in a vessel may be substantially (e.g., at least 50, 80, 90, 95, or 97 percent) or entirely MOF adsorption media as described herein, and other types of adsorption media are not required and may be excluded from the vessel interior. In other words, the total amount of adsorbent that is contained at an interior of a vessel may comprise, consist essentially of, or consist of MOF-type adsorption media, particularly including the general and specific types of MOF adsorbents described herein, such as the general and specific examples of zeolitic imidazolate framework (ZIF) adsorbents described herein.

According to the present description, a composition that consists essentially of a specified material or combination of materials is a composition that contains the specified material or materials and not more than an insignificant amount of any other material, e.g., not more than 2, 1, 0.5, 0.1, or 0.05 percent by weight of any other material. For example, a description of a vessel interior that contains adsorbent that consists essentially of MOF adsorption media (e.g., ZIF adsorbent) refers to a vessel having an interior that contains the MOF adsorption media (e.g., ZIF adsorbent) and not more than 2, 1, 0.5, 0.1, or 0.05 percent by weight of any other type of adsorption media, based on total weight adsorption media at the vessel interior.

The adsorbent has a sorptive affinity for one or more reagent gases. The adsorbent is useful for selectively, e.g., reversibly, adsorbing and desorbing reagent gas onto the adsorbent to allow the reagent gas to be: first delivered into the vessel in a manner to cause the reagent gas to adsorb onto the adsorbent; then held in equilibrium with an amount of condensed or desorbed, gaseous, reagent gas also at the vessel interior to store the adsorbed and gaseous reagent gas portions within the closed vessel interior, e.g., under pressure; and eventually to allow the reagent gas to be desorbed from the adsorbent and removed from the vessel through an opening in the vessel as gaseous reagent gas, e.g., by use of a pressure regulator to deliver the reagent gas at a pressure that is reduced relative to the vessel interior pressure, e.g., at a pressure that is approximately atmospheric pressure or that is sub-atmospheric.

The MOF adsorbent may be any known or future-developed MOF adsorbent, and may be selected based on factors that include: the type (chemical composition) and amount of reagent gas to be contained in the vessel, the interior volume of the vessel, the pressure at which the reagent gas will be stored in the vessel, among other factors. Metal-organic frameworks (MOFs) are nanoporous materials consisting of organic linkers coordinated to metal ions in crystalline structures. A subclass of MOFs, known as zeolitic imidazolate frameworks (ZIFs), consist of metal (mainly tetrahedral $Zn^{+2}$) bridged by the nitrogen atoms of imidazolate linkers. Various MOF adsorbent materials are known in the reagent gas, reagent gas storage, and gas separations arts. Certain examples of MOF materials are described in U.S. Pat. No. 9,138,720, and also in U.S. Patent Application Publication 2016/0130199, the entireties of each of these documents being incorporated herein by reference.

Preferred MOFs can exhibit particularly useful or advantageous performance with respect to the amount of reagent gas an adsorbent can adsorb, under pressure, within a storage vessel. Certain presently-preferred MOF adsorbent materials can exhibit desirable or particularly useful performance in terms of a high "deliverable capacity" compared to vessels that are the same but contain no adsorbent or a non-MOF adsorbent, e.g., a zeolite or carbon-based adsorbent. The term "deliverable capacity" refers to an amount of gas by weight or volume that can be stored and subsequently delivered in useful, pure, unreacted state from an adsorbent-containing vessel of fixed size between states of full and empty (empty typically defined by the lowest pressure achievable by the end use process to which the gas is delivered, e.g. 5 Torr often for Ion Implantation tools).

Comparative examples can be made between a vessel that contains MOF adsorbent, relative to the same vessel that contains an identical amount of a useful zeolite or carbon-based adsorbent, e.g., for use in storing arsine or phosphine as a reagent gas, under pressure. Each vessel has the same total internal volume and the same amount by volume of adsorbent. The vessel that contains carbon-based adsorbent will exhibit a deliverable gas capacity curve, when plotted against interior pressure of the vessel, that increases sharply over pressures below 650 Torr, slowing as the pressure approaches 1000 Torr, and then continues to increase more gradually over a higher range of internal pressures, including pressure ranges above 5,000 or 10,000 Torr, which include commercially useful ranges of internal pressure. In comparison, a vessel that contains a useful or preferred MOF adsorbent material of the present description can exhibit a relatively higher deliverable capacity compared to the carbon-based adsorbent at higher ranges of pressure (e.g., above 7,000 Torr (absolute), or above 10,000 Torr (absolute), or above 15,000 Torr (absolute), or above 20,000 Torr (absolute)). This occurs even if the deliverable capacity of the MOF-containing vessel is below that of the carbon-based adsorbent at below one or more of these pressures. See the Examples, below, and FIGS. 2 and 3.

By this comparison, certain preferred vessels of the present description that contain MOF adsorbent material are considered to exhibit a storage capacity (e.g., "deliverable capacity") of reagent gas (e.g., a hydride such as arsine or phosphine) that is greater than a storage capacity of the reagent gas in a comparable vessel that includes carbon-based adsorbent alone instead of the metal-organic framework adsorbent, especially at an interior vessel pressure that is at least above 7,000 or above 10,000, or above 15,000 Torr (absolute). The particular pressure at which an improvement in deliverable capacity, relative to carbon adsorbent, will occur, can depend on feature of the vessel, MOF adsorbent, and reactant gas, such as the type (chemical composition) of the reactant gas and the type (chemical composition) of the adsorbent.

Metal-organic frameworks include generally highly porous materials made from organic linkers coordinated to metal ion or metal oxide clusters in crystalline structures. One class of MOF that is useful or preferred as an adsorbent for a super-atmospheric vessel of the present description is the class of zeolitic imidazolate frameworks, or "ZIFs." Zeolitic imidazolate frameworks are a type of MOF that includes a tetrahedrally-coordinated transition metal such as iron (Fe), cobalt (Co), nickel (Ni), copper (Cu), magnesium (Mg), manganese (Mn) or zinc (Zn), connected by imidazolate linkers, which may be the same or different within a particular ZIF composition or relative to a single transition metal atom of a ZIF structure. The ZIF structure includes four-coordinated transition metals linked through imidazolate units to produce extended frameworks based on tetrahedral topologies. ZIFs are said to form structural topologies that are equivalent to those found in zeolites and other inorganic microporous oxide materials.

Certain specific examples form a three-dimensional cage-like structure that includes an internal volume defined by a surface that forms a highly structured shell or "cage," with the shell or cage including openings or "pores" at the outer surfaces of the cage that allow access to the internal volume. These zeolitic imidazolate frameworks can be characterized by features that include the type of transition metal (e.g., iron, cobalt, nickel, copper, magnesium, manganese or zinc), the chemistry of the linker (e.g., chemical substituents of the imidazolate units), pore size of the ZIF, surface area of the ZIF, internal volume of the ZIF molecular "cage," among other physical and chemical properties. Dozens (at least 105) of unique ZIF species or structures are known, each having a different chemical structure based on the type of transition metal and the type of linker (or linkers) that make up the framework. Each topology is identified using a unique ZIF designation, e.g., ZIF-1 through ZIF-105. For a description of ZIFs, including particular chemical compositions and related properties of a large number of known ZIF species, see Phan et al., "Synthesis, Structure, and Carbon Dioxide Capture Properties of Zeolitic Imidazolate Frameworks," Accounts of Chemical Research, 2010, 43 (1), pp 58-67 (Received Apr. 6, 2009).

The molecular structure of a MOF, e.g., ZIF, can affect the ability of the MOF to adsorb a gas. Specifically, pore size, pore volume, or both, of a cage-type MOF or ZIF molecule can affect the ability of the crystalline framework to absorb and contain a gas molecule. "Pore size" of a MOF is typically used in reference to the size of pores located at a surface of the structure, i.e., the size of surface pores or "access pores" of the framework. "Pore volume", as used herein, refers to the interior volume or open space within the structure of a MOF adsorbent material.

Pore size of a ZIF can affect the performance of a ZIF as an adsorbent. Example ZIFs can have pore sizes in a range from about 0.2 to 13 angstroms, and potentially larger. Pore size refers to the diameter of the largest sphere that will pass through the surface of the ZIF crystal. For use as an adsorbent in a vessel of the present description, a ZIF can have any pore size that is effective to provide desired storage performance, with a preferred ZIF for a particular reagent gas being capable of providing an improved storage capacity relative to vessel containing no adsorbent or a non-ZIF or a non-MOF adsorbent at super-atmospheric pressure. Pore size can be selected, for example, based on the type of reagent gas to be adsorbed by the ZIF, the pressure at which the ZIF will be used, and other factors. For use in a vessel as described, for adsorbing a reagent gas (e.g., a hydride) at super-atmospheric pressure, a useful or preferred ZIF can be one that has a pore size in a range from 2.5 to 13 angstroms or more particularly, from 3 angstroms to 9 angstroms or from 3.2 to 12 angstroms. These may contain a significant volume of interior pores that are larger and perhaps mesoporous, e.g., greater than 20 angstroms and below 500 angstroms.

One example of a ZIF that has been found to be useful in a vessel as described, for adsorbing a hydride reagent gas such as arsine or phosphine, at super-atmospheric pressure, is referred to as "ZIF-8," which is zinc dimethylimidazolate (a.k.a. "zinc(methylimidazolate)$_2$)." This zeolitic imidazolate framework is reported to have a pore size of 3.4 angstroms. See U.S. Pat. No. 9,138,720, describing ZIF-8 among other MOFs.

The MOF can be in any form, such as granular (particles), disks, pellets, monolithic, or otherwise. For various example embodiments, a preferred MOF may be in the form of particles, which can be easily placed (e.g., poured) into a vessel such as a cylinder that includes a relatively small opening. Still, other forms of MOF can also be useful or even preferred for different embodiments, including monolithic or block adsorbents, rods, or space-filling polyhedron adsorbents. Within an exemplary vessel, at a temperature at which the vessel will be used to deliver reagent gas, the contained reagent gas can be in a form that includes a portion that is in a condensed or gaseous form (i.e., as gaseous reagent gas), in equilibrium with adsorbed reagent gas. The temperature of the vessel and reagent gas can be within a range of temperatures to which the vessel may be exposed during use (e.g., a temperature in a range from about 0 to about 50 degrees Celsius). This range includes operating temperatures, which are typical temperatures at which the vessel will be held during controlled storage and use in an "ambient temperature" or room temperature environment, generally understood to include temperatures in a range from about 20 to about 26 degrees Celsius. For certain applications, the vessel may alternatively be heated to a temperature above room temperature (e.g., a temperature in a range of about 30 to about 150 C) but below reaction temperature of the reagent gas and adsorbent, to facilitate removal of the adsorbed reagent gas.

At a temperature at which the vessel will be used to deliver reagent gas, the gaseous reagent gas can be at a super-atmospheric pressure, i.e., at a pressure of at least about 1 atmosphere (760 Torr), absolute. A preferred internal pressure of the vessel can be a pressure at which the vessel contains a higher amount of reagent gas as compared to a non-MOF (e.g., carbon-type) adsorbent, e.g., as measured by delivery capacity. Such a preferred pressure may be, e.g., above 7,000, above 10,000, or above 15,000 Torr (absolute), with the particular pressure at which an improvement in deliverable capacity will occur depending on features of the vessel and reactant gas, such as the type (chemical composition) of the reactant gas and the type (chemical composition) of the adsorbent. The internal pressure of the vessel may be in this range during use, and particularly when the vessel contains a maximum amount of reagent gas, i.e., when the vessel is "filled" with reagent gas. During use, as reagent gas is gradually removed from the vessel, the internal vessel pressure will gradually be reduced and may even reach a pressure that is below atmospheric pressure, for example when the reagent gas is being removed at sub-atmospheric pressure (under vacuum) and after much or most of the reagent gas has been delivered from the vessel.

Various examples of vessel structures for storing a reagent gas at super-atmospheric pressure are known and can be useful by adaptation according to the present description. Example vessels include cylindrical containers ("cylinders") that include rigid cylindrical sidewalls that define a vessel interior and an outlet (or "port") at an end of the cylinder. The vessel sidewalls can be made of metal or another rigid, e.g., reinforced, material, and are designed to withstand a level of pressure that safely exceeds a desired maximum pressure recommended for containing reagent gas at the interior of the vessel. Example vessels are capable of storing reagent gas at super-atmospheric pressure, e.g., a pressure of greater than atmospheric pressure (about 760 Torr, absolute), e.g., at a pressure (absolute) of up to about 10,000 Torr (absolute), e.g., up to 15,000 Torr (absolute) or up to 20,000 or 25,000 Torr (absolute).

Attached to the outlet is typically a valve ("delivery valve") that can be opened and closed to enable or stop flow between the interior and exterior of the vessel.

A vessel of the present description also includes or is used with a pressure regulator or plurality of pressure regulators that provide a portion of a flow path of reagent gas from the vessel interior to a point of use at an exterior of the vessel. Example vessels include the outlet, a delivery valve attached to the outlet, e.g., as part of a "valve head," to selectively allow reagent gas to be added to or removed from the vessel interior. The pressure regulator is also in the flow path between the interior of the vessel and a point of use, and may be present at the interior of the vessel between the delivery valve and the reagent gas and adsorbent, i.e., "upstream" from the delivery valve. A useful arrangement of the delivery valve and pressure regulator allows for the valve to be opened to cause a flow of reagent gas from the interior, through the pressure regulator, through the valve, and to a location at an exterior of the vessel at which the reagent gas is used (i.e., a "point of use" for the reagent gas). The vessel, at the valve head, may also include a dual port valve assembly to allow filling the vessel through a port (valve) that is different from the port (valve) through which gas is delivered.

The reagent gas, present at a high pressure at the vessel interior, passes through the pressure regulator(s) and exits the pressure regulator(s) at a reduced pressure. In a useful or preferred arrangement of the vessel, delivery valve, and pressure regulator(s), the delivery valve is opened to allow reagent gas to flow from the super-atmospheric pressure interior, through the pressure regulator(s), and through the delivery port, to flow out of the vessel at a significantly-reduced pressure, such as at a sub-atmospheric pressure. The sub-atmospheric pressure of the flow of reagent gas out of the vessel may be, for example, below 760 Torr (absolute), e.g., below 675, 650, 600, 500, 400, 200, 100, or 50 Torr (absolute).

It will be appreciated that the gas storage and dispensing system may have any useful arrangement of the pressure regulator and delivery valve relative to the vessel interior and exterior, with positioning of the pressure regulator being present, for example, in the neck or other portion of the interior volume of the vessel and (optionally and preferably) upstream of the delivery valve. In preferred examples, the pressure regulator can be located at least partially within the interior volume of the vessel to protect the pressure regulator from shock, impact, and vibration during storage, transport, and use of the vessel. It is also advantageous for safe transport of the potentially hazardous pressurized reagent gas, for the gas pressure to be internally regulated to a sub-atmospheric pressure such that accidental opening of, or damage to, the delivery valve does not release high pressure gas.

A pressure regulator can be any pressure regulating device that will be useful to reduce a pressure of the reagent gas as the reagent gas is present at the interior of the vessel, to a substantially lower pressure as desired for a point of use; example pressure regulators can be effective to reduce the pressure from a pressure in excess of 10,000, 20,000, or 25,000 Torr (absolute) to a reduced pressure of below 760 Torr (absolute), e.g., below 675, 650, 600, 500, 400, 200, 100, or 50 Torr (absolute), with good precision. Alternatively, a first regulator may be used to reduce the initial moderate to high pressure of 10,000, 20,000, or 25,000 Torr down to an intermediate pressure of 6,000, 5,000, or 4,000 Torr and a second regulator reduce the intermediate pressure down to a reduced pressure of below 760 Torr (absolute), e.g., below 675, 650, 600, 500, 400, 200, 100, or 50 Torr (absolute), with good precision.

Examples of pressure regulators that may be useful to regulate flow from a vessel as described include those referred to as "poppet valves," those referred to as mechanical capillary-type pressure regulators, and combinations of these.

Particular examples include one or a set or series of "poppet valve" elements, each poppet valve being effective to reduce a pressure of flow through the regulator. Each poppet valve is biased against a seat structure, such as by the use of a diaphragm and one or more springs and spring adjustments, in a way that allows the flow of gaseous fluid gas between the seat structure and the poppet at not more than a desired maximum pressure level, which may be referred to as a "set point" pressure of the regulator or the poppet and diaphragm. Examples of useful commercially available pressure regulator include those sold under the Swagelok® HF brand of pressure regulators (commercially available from Swagelok Company, www.swagelok.com). The use of high-precision regulators allows reagent gas to be reliably dispensed from a pressure-regulated vessel of the present description at a desired relatively low set point pressure level.

Examples of fluid supply vessels and appurtenant flow control devices such as pressure regulators and flow control valves of types that may be useful in a general sense according to the present description are described, e.g., in U.S. Pat. Nos. 6,620,225, 6,660,063, and 6,857,447, the entire content of each of these documents being incorporated herein by reference.

The described vessels and method can be useful for storing, handling, and delivering any reagent gas that may be stored as described, at equilibrium between an adsorbed portion and a condensed or gaseous portion. A vessel as described can be particularly desirable for storing a reagent gas that is hazardous, noxious, or otherwise dangerous. Illustrative examples of reagent gases for which the described vessels and methods are useful include the following non-limiting gases: silane, methyl silane, trimethyl silane, hydrogen, methane, nitrogen, carbon monoxide, diborane, $BP_3$, arsine, phosphine, phosgene, chlorine, $BCl_3$, $BF_3$, diborane ($B_2H_6$ and its deuterium analog, $B_2D_6$), tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, deuterated hydrides, trimethyl stibine, halide (chlorine, bromine, iodine, and fluorine), gaseous compounds such as $NF_3$, $ClF_3$, $GeF_4$, $SiF_4$, $AsF_5$, $PF_3$, organo compounds, organometallic compounds, hydrocarbons, organometallic Group V compounds such as $(CH_3)_3Sb$, and other halide compounds that include boron halides (e.g., boron triiodide, boron tribromide, boron trichloride), germanium halides (e.g., germanium tetrabromide, germanium tetrachloride), silicon halides (e.g., silicon tetrabromide, silicon tetrachloride), phosphorus halides (e.g., phosphorus trichloride, phosphorus tribromide, phosphorus triiodide), arsenic halides (e.g., arsenic pentachloride), and nitrogen halides (e.g., nitrogen trichloride, nitrogen tribromide, nitrogen triiodide). For each of these compounds, all isotopes are contemplated.

An example of a presently-preferred embodiment of a vessel of the present description is shown at FIG. 1.

FIG. 1 is a schematic cross-sectional view of example gas storage and dispensing system 300. System 300 includes vessel 302 of generally cylindrical form, with a cylindrical sidewall 304 closed at its lower end by floor member 306. At the upper end of vessel 302 is neck 308 including a cylindrical collar 310 defining and circumscribing a top opening (port) of vessel 302. The vessel sidewall 304, floor member 306, and neck 308 thereby enclose an interior volume 328, as shown, in which MOF adsorbent 311, as described herein, is contained in powder, granular, particulate, pellet, extrudate, block, rod, or monolith form. MOF adsorbent 311 has a suitably high sorptive affinity and capacity for a reagent gas also contained at interior 328, so that the reagent gas is sorptively held by the adsorbent as well as subsisting in condensed or gaseous form in the interstices and head space 315 of vessel 302.

At neck 308 of vessel 302, threaded plug 312 of valve head assembly 314 is threadably engaged with the interior threaded opening of collar 310. Valve head assembly 314 includes a central fluid flow passage 320 joined in fluid flow communication with a central working volume cavity in the valve head assembly. The central working volume cavity in turn is joined to outlet 324, which may be exteriorly threaded or otherwise constructed for attachment of a connector and associated piping, conduit, etc. thereto.

Disposed in the central working volume cavity is a valve element 322 that is joined to a hand wheel 326 in the embodiment shown, but may alternatively be joined to an automatic valve actuator or other controller or actuating means.

Valve head assembly 314 also features in the valve block a fill passage 316 communicating with fill port 318 and interior volume 328 of vessel 302. Vessel 302 may thereby be charged with pressurized gas, following which the fill port is closed and capped, as shown.

Central fluid flow passage 320 in valve head assembly 314 is joined at its lower end to connector flow tube 330, to which in turn is joined regulator 332. Gas pressure regulation is accomplished by one (as depicted) or, in some embodiments, two (in the case of dual-stage regulation) regulators 332. Regulator(s) 332 is/are set to maintain a selected pressure of the reagent gas discharged from vessel 302. At the lower end of regulator(s) 332 is joined tubular fitting 336 which in turn is joined, e.g., by butt welding, to optional filter unit 334. Filter unit 334 serves to prevent potential fluid transport of small particles from the adsorbent bed to the pressure regulator(s) 332, valve head assembly 314, or downstream process.

In use, reagent gas is contained under pressure at interior volume 328 of vessel 302, sorptively held by the adsorbent, and in gaseous form in void spaces and the head space 315 of the vessel. Pressure regulator(s) 332 is/are set to a selected set point to provide flow of dispensed reagent gas when the valve in the valve head assembly 314 is opened, with the reagent gas flowing through optional filter unit 334, fitting 336, regulator(s) 332, connector flow tube 330, central fluid flow passage 320 in the valve head assembly 314, the central working volume cavity, and outlet 324. Valve head assembly 314 may be joined to other piping, conduits, flow controllers, monitoring means, etc., as may be desirable or required in a given end use application of the disclosure, and through which reagent gas may be flowed, at sub-atmospheric pressure. The end use may be performed by a system or tool such as an ion-implantation tool that is connected to outlet 324. The reagent gas, at a sub-atmospheric pressure, may be flowed from outlet 324 to the tool and used by the tool at a sub-atmospheric pressure.

The gas storage and dispensing vessel 302 of FIG. 1 may by way of example contain a hydride (e.g., arsine or phosphine) reagent gas that is sorptively retained in the vessel by MOF adsorbent such as a ZIF adsorbent, e.g., ZIF-8, at a pressure as described herein, e.g., of up to or exceeding 7,000, 10,000, 15,000, 20,000, or 25,000 Torr(absolute).

Vessel 300 of FIG. 1 may be arranged for super-atmospheric pressure storage of reagent gas, for dispensing at approximately atmospheric pressure or at sub-atmospheric pressure. Vessel 300 of FIG. 1 is shown as including a single stage internal regulator arranged so that reagent gas flows through the regulator before entering valve head 314, after which the reagent gas flows through the valve therein and through outlet 324. The FIG. 1 arrangement may be used in conjunction with a regulator in a gas cabinet adapted to hold vessel 300, to thereby provide dual stage regulator performance and individualized pressure control at valve head 314 of vessel 300 as well as exteriorly thereof.

In certain examples of the present disclosure, a storage vessel (e.g., 300) that contains a hydride, e.g., arsine, phosphine, germane, silane, diborane, methane or a combination of any of these, includes adsorbent 311 that comprises, consists of, or consists essentially of zeolitic imidazolate framework adsorbent, e.g., ZIF-8. A vessel that contains adsorbent that comprises zeolitic imidazolate framework, e.g., ZIF-8, can contain adsorbent that is at least 50, 70, 80, or 90 percent zeolitic imidazolate, e.g., ZIF-8. A vessel that consists of zeolitic imidazolate, e.g., ZIF-8, contains only zeolitic imidazolate, e.g., ZIF-8. A vessel that consists essentially of zeolitic imidazolate, e.g., ZIF-8, contains not more than 2, 1, 0.5, 0.1, or 0.05 percent by weight of another type of adsorbent.

EXAMPLES

Example 1

Figure 2:
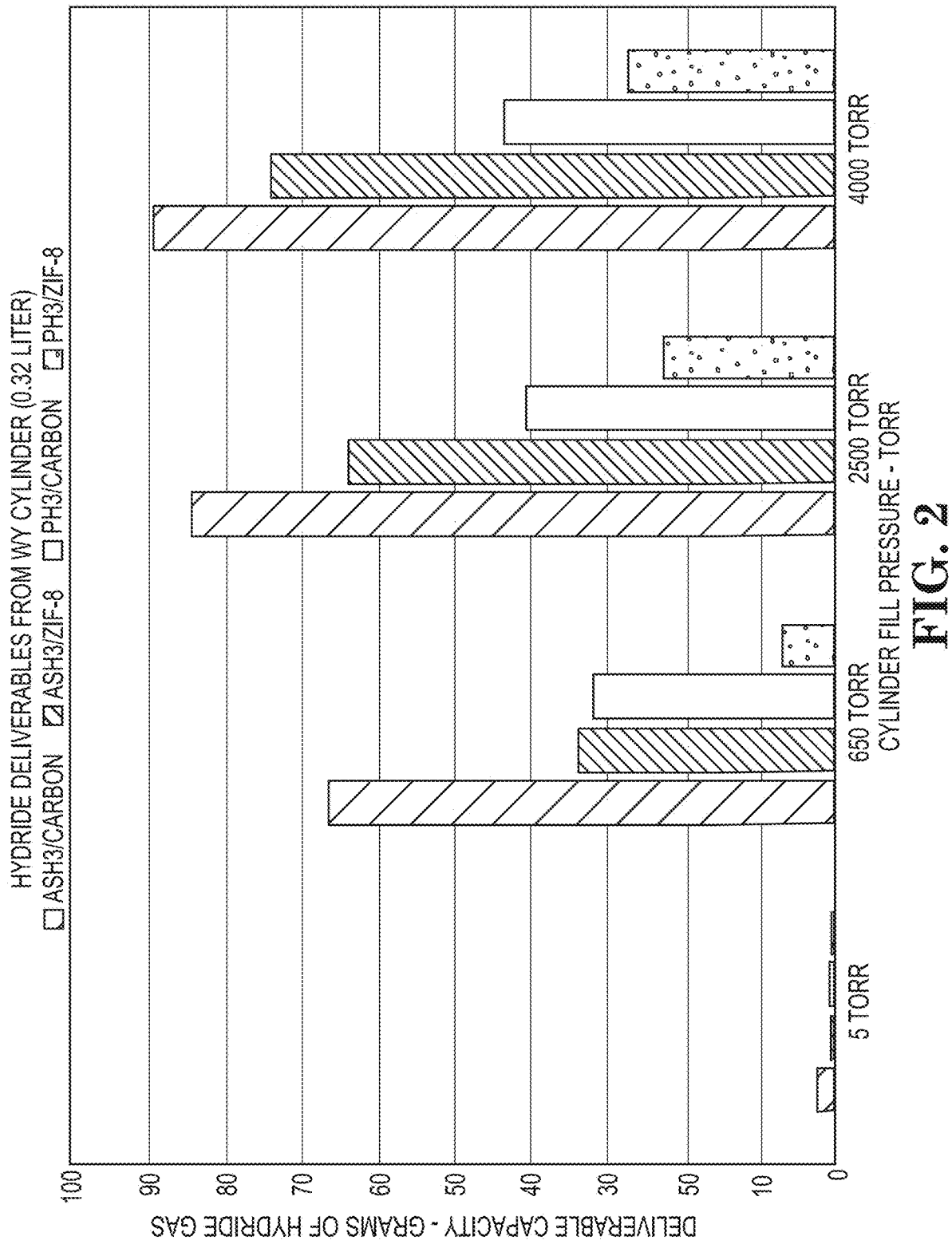
FIGS. 2-6 show adsorption capacity data of vessels of the disclosure that contain MOF adsorbent, and comparative vessels that contain carbon adsorbent.
Figure 3:
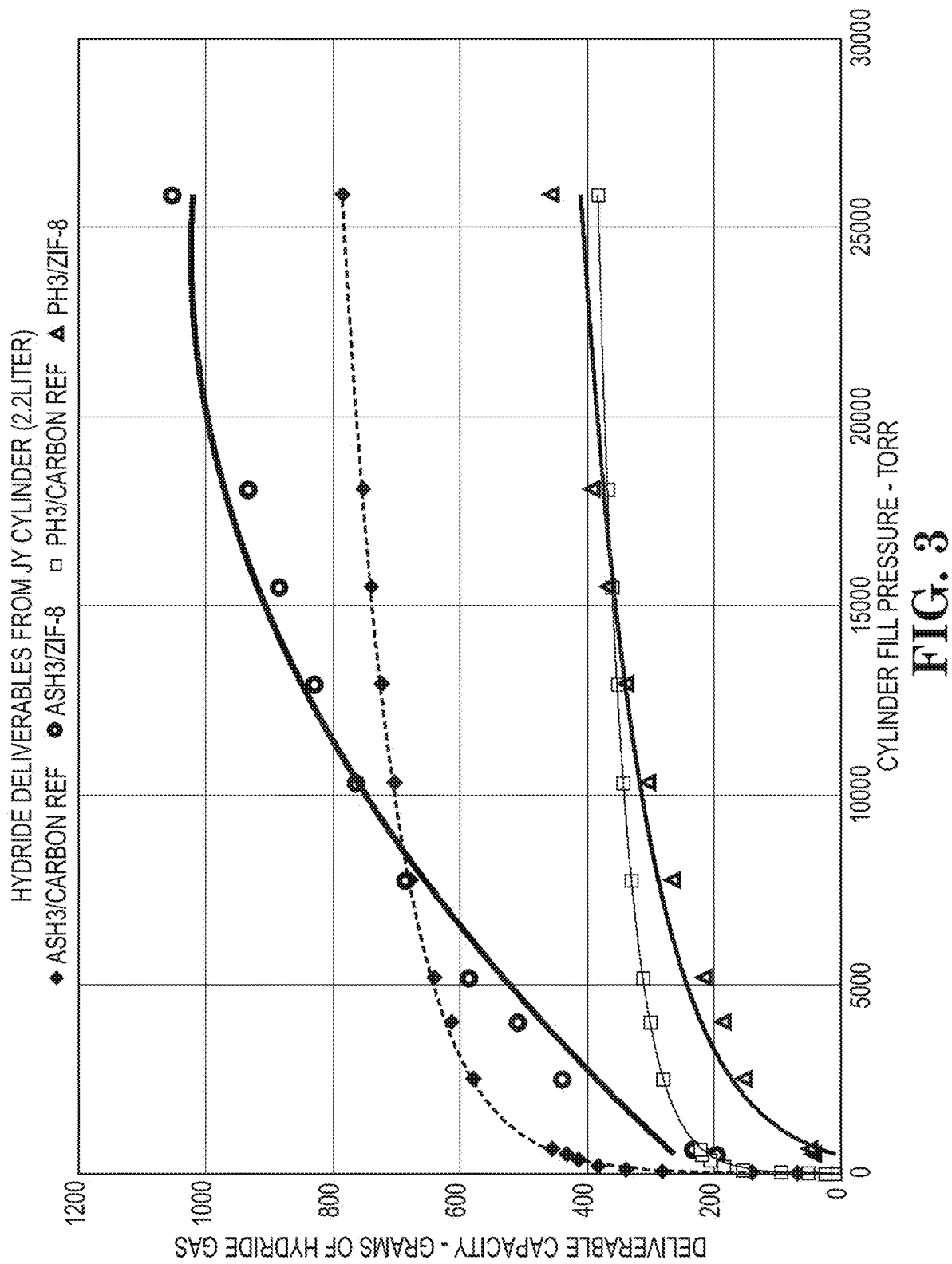

Vessel 300, containing adsorbent that consists of ZIF-8, and arsine or phosphine as a reagent gas, can exhibit reagent gas capacity as shown by the following examples, and FIGS. 2 and 3.

Test cylinders were prepared to include ZIF-8 (zinc dimethylimidazolate, or zinc(methylimidazolate)$_2$) for comparison to comparable cylinders filled with commercial microporous carbon pellets. Tested pellets were of a cylindrical geometry in general with a diameter of 0.5 mm or greater and a length of 1 mm or greater. The carbon pellets were roughly 2 mm in diameter by ~2 mm in length and quite solid and robust. The ZIF-8 pellets to the contrary were much more friable. As prepared the ZIF-8 pellets had lengths from ~1 mm to ~10 mm and a longer aspect ratio (typical length/diameter>5). However the delicate nature of the ZIF-8 pellets meant that the adsorbent load within the test cylinders also included some broken or crumbled fragments that were smaller particles.

A test vessel (containing the ZIF-8 pellets) was filled with phosphine, and another test vessel (containing ZIF-8) was filled with arsine, over a range of super-atmospheric pressure. Separate comparative vessels (with the carbon adsorbent) were filled with arsine and phosphine, also over a range of super-atmospheric pressures. See FIGS. 2 and 3.

As shown in FIGS. 2 and 3, amount of deliverable reagent gas contained in the comparative vessels, at an internal pressure 650 Torr and below, showed the carbon adsorbent to be far superior in terms of volumetric deliverable capacity within the sub-atmospheric realm. The data also show that the ZIF-8 adsorbent becomes somewhat more efficient at higher fill pressures.

The extrapolated data, representing pressures up to about 500 psi (absolute) are shown at FIG. 3. Once cylinder fill pressure exceeds 100 psi, the ZIF-8 material appears to hold more deliverable arsine than the carbon material. At about 300 psi, the ZIF-8 catches up with the carbon for deliverable phosphine capacity. From this data, in a mechanically regulated cylinder filled with adsorbent and charged with arsine at positive pressures above 100 psi or phosphine above 300 psi, the ZIF-8 MOF material shows potentially greater deliverable capacity than the carbon adsorbent.

Example 2

Figure 4:
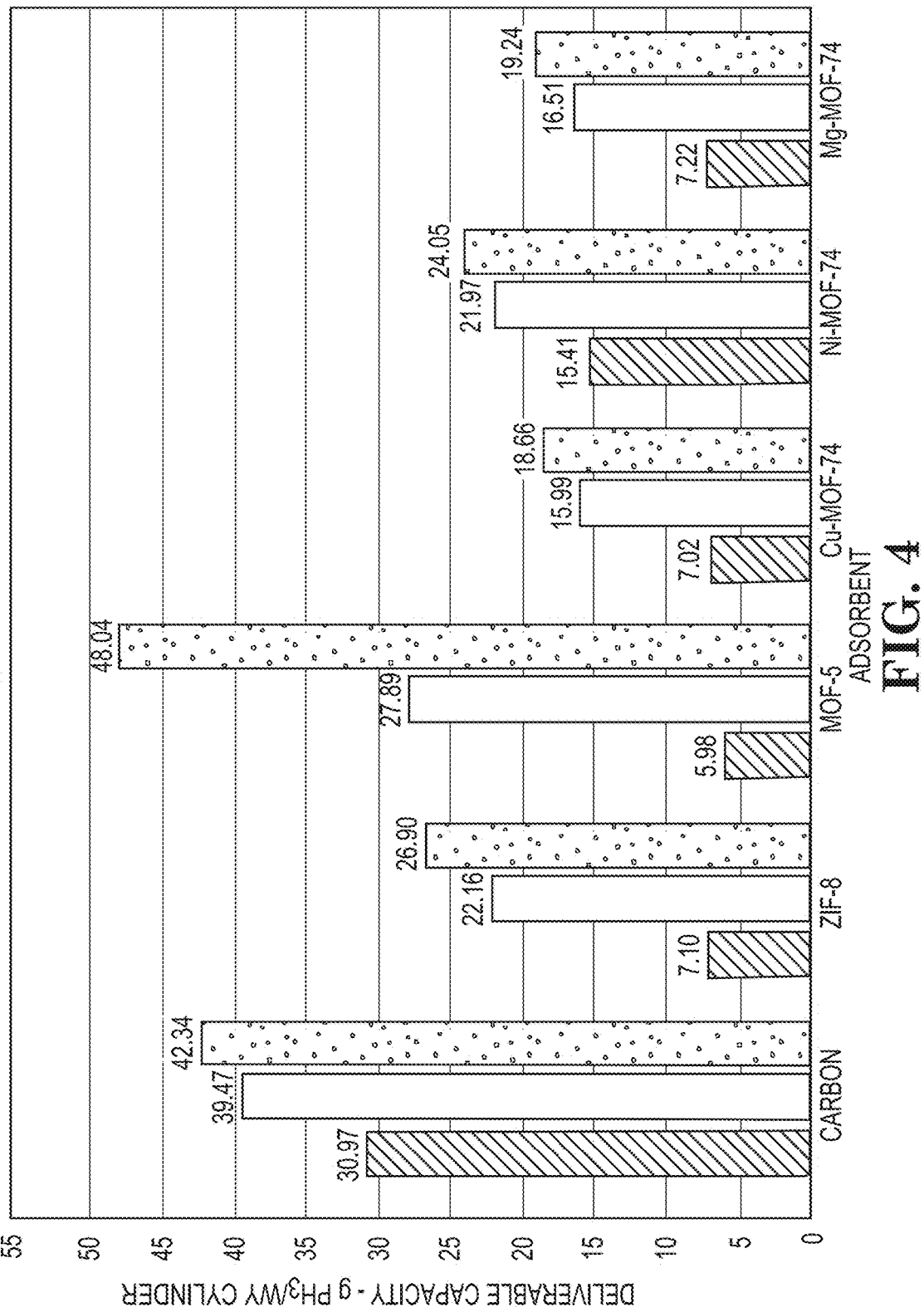
Figure 5:
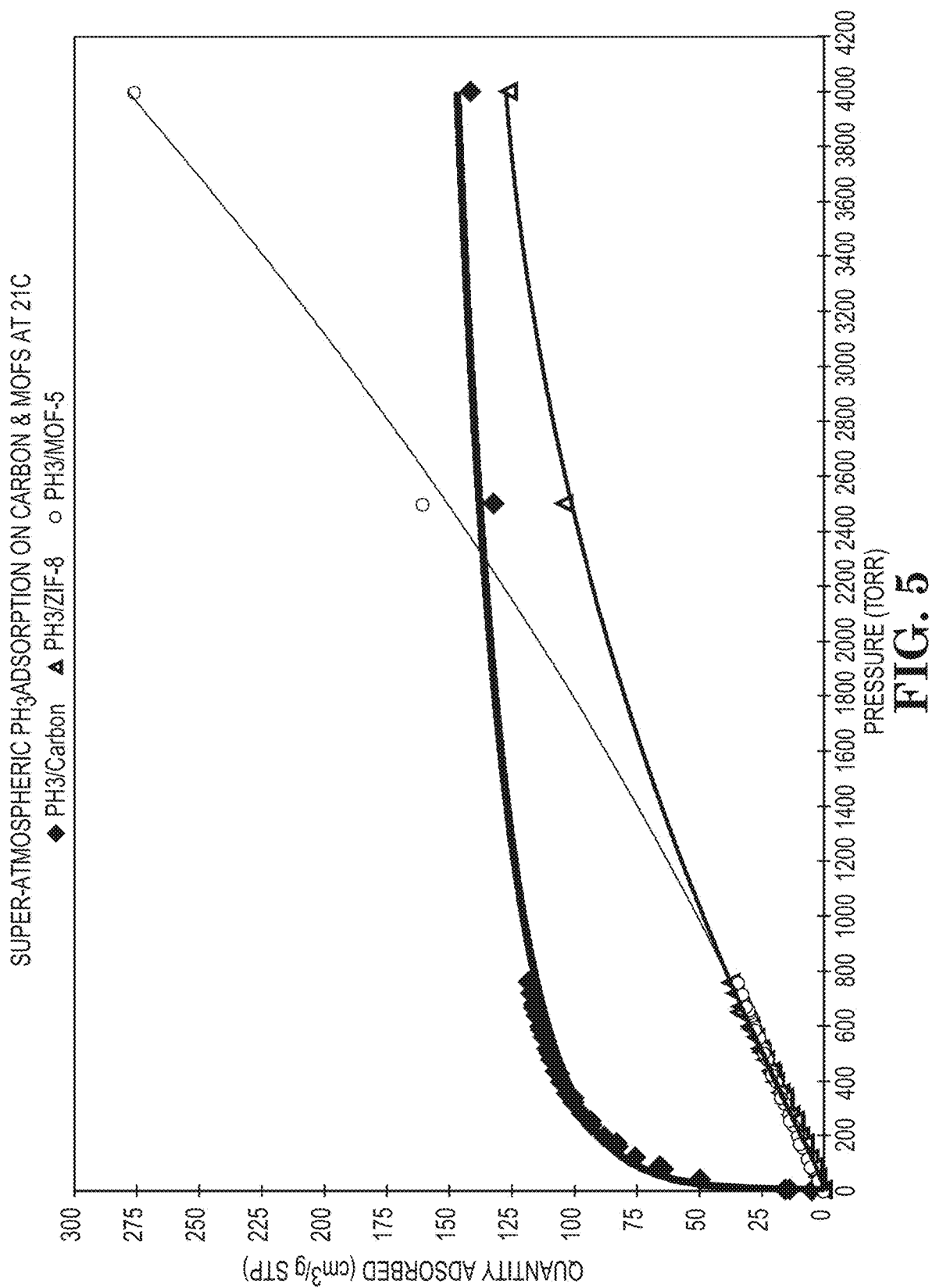

Vessels 300, containing adsorbents that consists of ZIF-8, of MOF-5, of Cu-MOF-74, of Ni-MOF-74 and of Mg-MOF-74, and phosphine (PH$_3$) as a reagent gas, can exhibit reagent gas capacity as shown by the following examples, and FIGS. 4 and 5.

Test cylinders were prepared to include each of ZIF-8 (zinc dimethylimidazolate), MOF-5 (zinc oxo terephthalate), Cu-MOF-74 (copper 2,5-dihydroxybenzenedicarboxylic acid), Ni-MOF-74 (nickel dihydroxybenzenedicarboxylic acid), Mg-MOF-74 (magnesium dobdc), ZIF-67 (cobalt dimethylimidazolate), and of PCN-250(Fe) (iron azobenzene tetracarboxylate) for comparison to comparable cylinders filled with commercial microporous carbon pellets. Tested MOFs were of a loose powder or granulate form in general with a particle size of 0.01 mm to 0.05 mm. The carbon pellets were roughly 2 mm in diameter by ~2 mm in length.

Test vessels (containing the various adsorbent media) were filled with phosphine over a range of pressures from 0.1 Torr up to 4000 Torr. See FIGS. 4 and 5.

As shown in FIGS. 4 and 5, amount of deliverable reagent gas contained in the comparative vessels, at an internal pressure 650 Torr and below, showed the carbon adsorbent to be far superior to all the MOFs in terms of volumetric deliverable capacity within the sub-atmospheric realm. The data also show that the ZIF-8, MOF-5 and Ni-MOF-74 adsorbents become somewhat more efficient at fill pressures above one atmosphere or 760 Torr.

The test data shows that the MOF-5 adsorbent catches up with the carbon for deliverable phosphine capacity at a fill pressure of 4000 Torr while ZIF-8 and Ni-MOF-74 are closing the gap. This is true to a much less obvious degree for the Cu-MOF-74 or the Mg-MOF-74 adsorbents.

Example 3

Figure 6:
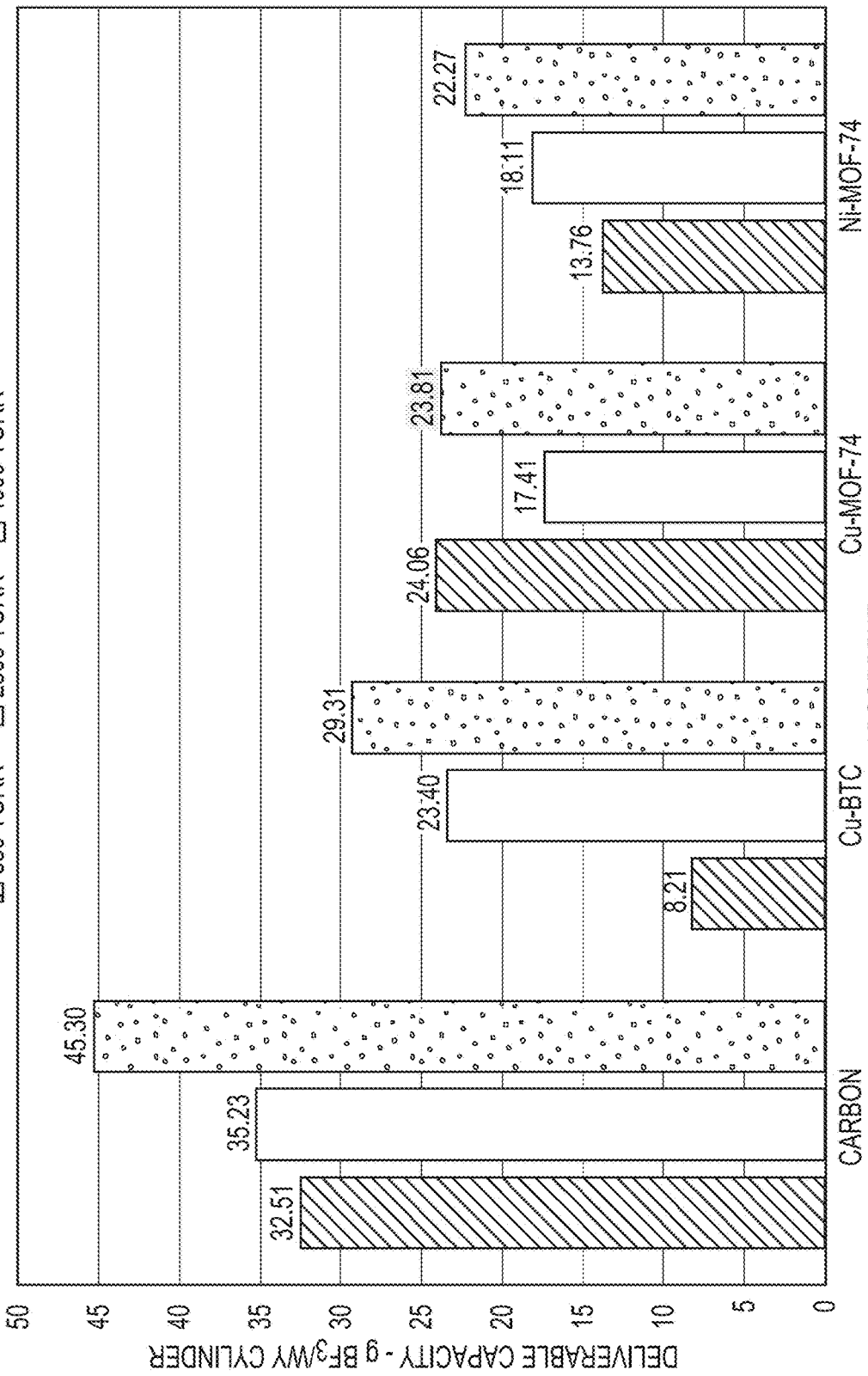

Vessels 300, containing adsorbents that consists of Cu-BTC, of Cu-MOF-74, and of Ni-MOF-74, and boron trifluoride (BF$_3$) as a reagent gas, can exhibit reagent gas capacity as shown by the following examples, and FIG. 6.

Test cylinders were prepared to include each of Cu-BTC (copper benzene-1,3,5-tricarboxylate), Cu-MOF-74 (copper 2,5-dihydroxybenzenedicarboxylic acid), and of Ni-MOF-74 (nickel dihydroxybenzenedicarboxylic acid) for comparison to comparable cylinders filled with commercial microporous carbon pellets. Tested MOFs were of a loose powder or granulate form in general with a particle size of 0.01 mm to 0.05 mm. The carbon pellets were roughly 2 mm in diameter by ~2 mm in length.

Test vessels (containing the various adsorbent media) were filled with boron trifluoride over a range of pressures from 0.1 Torr up to 4000 Torr. See FIG. 6.

As shown in FIG. 6, the amount of deliverable reagent gas contained in the comparative vessels, at an internal pressure 650 Torr and below, showed the carbon adsorbent to be far superior to all the MOFs in terms of volumetric deliverable capacity within the sub-atmospheric realm. The data also show that the Cu-BTC and Ni-MOF-74 adsorbents become somewhat more efficient at fill pressures above one atmosphere or 760 Torr. However, this does not appear to be evident for the Cu-MOF-74 adsorbent.

Example 4

Figure 7:
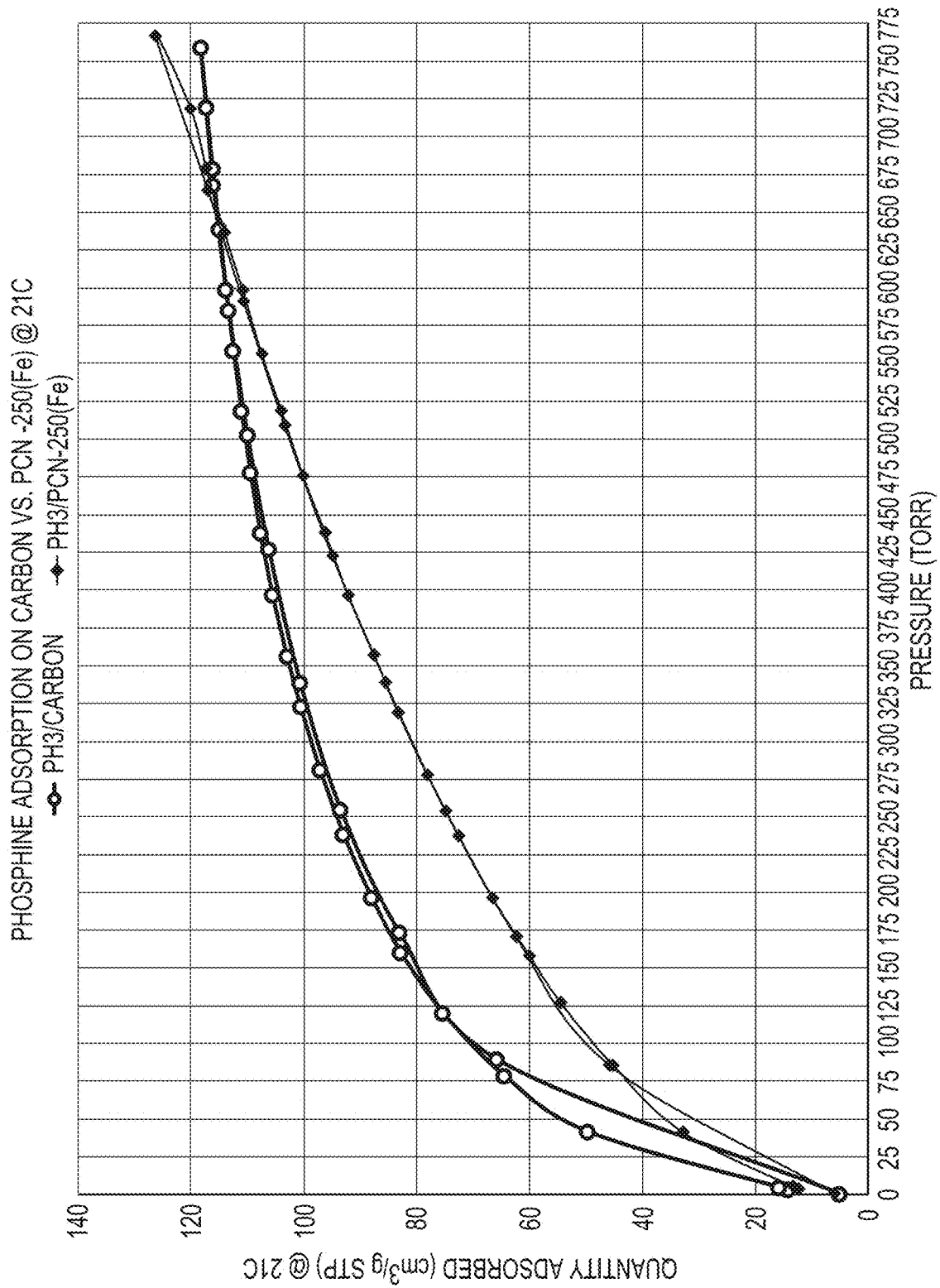
FIG. 7 shows comparative adsorption isotherms for carbon and a MOF adsorbent in accordance with embodiments of the disclosure.

The adsorbent PCN-250(Fe), when loaded with the reagent gas phosphine ($PH_3$), can offer enhanced storage and delivery capacity as the vessel fill pressure is increased above one atmosphere, as suggested by the following example and FIG. 7.

Phosphine adsorption isotherms were measured in parallel on a commercial carbon adsorbent material and the metal-organic framework adsorbent PCN-250(Fe). The PCN-250(Fe) adsorbent was tested in powder form, having particle size of 0.01 to 0.05 mm.

As shown in FIG. 7, the gravimetric phosphine capacity of the PCN-250(Fe) is less than that of the carbon below 600 Torr, but as pressure is increased to one atmosphere (760 Torr) the PCN-250(Fe) material catches up with the carbon. The shape of the adsorption isotherm curves suggests that if the pressure were further increased the PCN-250(Fe) would continue to improve in comparison to the carbon.

The examples disclosed herein herein are included to represent a small subset of the MOF inventive gas storage and supply vessel. They are not intended to limit the embodiments of the disclosure. Other MOFs considered to have the appropriate geometry and anticipated benefits include, but are not limited to, ZIF-11, ZIF-20, ZIF-67, ZIF-71, ZIF-90, MIL-53(Sc), MIL-100, MIL-101, MOP-1, MOF-177, MOF-180, MOF-200, MOF-205, MOF-210, MOF-399, MOF-505, MOF-908, PCN-6, PCN-14, PCN-222, PCN-250(Fe), NJU-Bai-41, NU-100, NU-109, NU-110, NU-111, MAF-38, UTSA-20, UMCM-2, etc. or combinations of two or more of these materials. All complex lattice cage structured MOFs with small surface access micropores (~0.3 to ~1.3 nm) and large void fraction (>65%) due to much pore volume (>0.75 cc/g) constituting larger diameter internal cavity (~1 to 4 nm) within the cage are considered likely to perform well in accordance with the various embodiments of this disclosure.

Aspects

Aspect 1. A gas storage and dispensing vessel enclosing an interior volume for holding reagent gas, the vessel comprising: a port; a valve mounted at the port; one or more pressure regulator(s) arranged to maintain a predetermined pressure of reagent gas discharged from the vessel; and one or more metal-organic framework adsorbent(s) within the interior volume; the vessel being selectively actuatable to flow gas from the interior volume of the vessel, through the pressure regulator(s) and the valve, for discharge of the reagent gas from the vessel.

Aspect 2. The vessel of aspect 1, wherein one or more pressure regulator(s) is/are located in single or dual-stage configuration at the interior volume.

Aspect 3. The vessel of aspect 1, wherein one or more of the one or more pressure regulator(s) is/are located in single or dual-stage configuration at the exterior of the vessel.

Aspect 4. The vessel of any one of aspects 1 to 3, wherein the metal-organic framework has a pore size in a range from 2.5 to 13 angstroms.

Aspect 5. The vessel of any one of aspects 1 to 4, wherein the metal-organic framework comprises a zeolitic imidazolate framework comprising tetrahedrally-coordinated transition metal atoms connected by imidazolate linkers.

Aspect 6. The vessel of aspect 4, wherein the transition metal atoms are zinc.

Aspect 7. The vessel of aspect 5, wherein the zeolitic imidazolate framework is zinc dimethylimidazolate.

Aspect 8. The vessel of any one of aspects 1 through 4, wherein the metal-organic framework comprises one or more materials selected from ZIF-8, ZIF-11, ZIF-20, ZIF-67, ZIF-71, ZIF-90, MIL-53(Sc), MIL-100, MIL-101, MOP-1, Cu-MOF-74, Ni-MOF-74, Mg-MOF-74, MOF-5, MOF-177, MOF-180, MOF-200, MOF-205, MOF-210, MOF-399, MOF-505, MOF-908, PCN-6, PCN-14, PCN-222, PCN-250(Fe), NJU-Bai-41, NU-100, NU-109, NU-110, NU-111, Cu-BTC, MAF-38, UTSA-20, and UMCM-2.

Aspect 9. The vessel of any one of aspects 1 through 4, wherein the metal-organic framework comprises one or more materials selected from ZIF-8 (zinc dimethylimidazolate), Cu-MOF-74 (copper 2,5-dihydroxybenzenedicarboxylic acid), Ni-MOF-74 (nickel dihydroxybenzenedicarboxylic acid), Mg-MOF-74 (magnesium dihydroxybenzenedicarboxylic acid) MOF-5 (zinc oxo terephthalate), PCN-250(Fe) (iron azobenzene tetracarboxylate) and Cu-BTC(copper benzene-1,3,5-tricarboxylate).

Aspect 10. The vessel of any one of aspects 1 through 4, wherein the metal-organic framework is combined with another adsorbent comprising a second metal-organic framework, carbon, zeolite, silica gel, or porous organic polymer.

Aspect 11. The vessel of any of aspects 1 through 10, wherein the adsorbent is in the form of granules, particulates, beads, pellets, disks, blocks, monolith, or space filling polyhedron.

Aspect 12. The vessel of any of claims 1 through 11 having reagent gas within the interior volume at super-atmospheric pressure, the reagent gas comprising a portion that is adsorbed on the adsorbent and a portion that is present as condensed or gaseous reagent gas in equilibrium with the adsorbed reagent gas.

Aspect 13. The vessel of aspect 12, wherein the vessel exhibits a storage capacity of the reagent gas at super-atmospheric pressure that is greater than the storage capacity of the reagent gas in a comparable vessel that has no adsorbent or comprises carbon or zeolite adsorbent instead of the metal-organic framework adsorbent.

Aspect 14. The vessel of aspect 13, wherein the reagent gas is: silane, methyl silane, trimethyl silane, hydrogen, methane, nitrogen, carbon monoxide, diborane, $BP_3$, arsine, phosphine, phosgene, chlorine, $BCl_3$, $BF_3$, diborane (e.g., $B_2H_6$ or $B_2D_6$), tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, a deuterated hydride, trimethyl stibine, halide (chlorine, bromine, iodine, and fluorine), $NF_3$, $ClF_3$, $GeF_4$, $SiF_4$, $AsF_5$, $PF_3$, an organometallic compound, a hydrocarbon, and an organometallic Group V compound.

Aspect 15. The vessel of aspect 13, wherein the reagent gas is: a boron halide, a germanium halide, a silicon halide, a phosphorus halide, an arsenic halide, or a nitrogen halide.

Aspect 16. The vessel of aspect 13, wherein the reagent gas is boron trifluoride, germanium tetrafluoride or silicon tetrafluoride.

Aspect 17. The vessel of aspect 13, wherein the reagent gas is a hydride.

Aspect 18. The vessel of aspect 13, wherein the reagent gas is arsine or phosphine.

Aspect 19. The vessel of any one of aspects 13 through 18, wherein the metal-organic framework comprises a zeolitic imidazolate framework.

Aspect 20. The vessel of aspect 19, wherein the metal-organic framework has a pore size in a range from 3.2 to 12 angstroms.

Aspect 21. The vessel of aspect 19, wherein the zeolitic imidazolate framework is zinc dimethylimidazolate.

Aspect 22. The vessel of aspects 19, 20, or 21 wherein:
the reagent gas is a hydride, and
the vessel has an interior pressure of at least 7,000 Torr.

Aspect 23. The vessel of aspect 22, wherein the hydride is arsine or phosphine.

Aspect 24. The vessel of aspect 23, wherein
the zeolitic imidazolate framework is zinc dimethylimidazolate,
the reagent gas is arsine, and
the vessel has an interior pressure of at least 7,000 Torr.

Aspect 25. The vessel of aspect 23, wherein
the zeolitic imidazolate framework is zinc dimethylimidazolate,
the reagent gas is phosphine, and
the vessel has an interior pressure of at least 15,000 Torr.

Aspect 26. A method of supplying reagent gas from a vessel as recited at any one of aspects 1 through 25, the method comprising delivering the reagent gas from the vessel interior, to a vessel exterior, the reagent gas being delivered from the vessel at a pressure at or below 5200 Torr.

Aspect 27. The method of aspect 26, wherein the reagent gas is delivered at a pressure below 760 Torr.

Aspect 28. The method of aspect 26 wherein the reagent gas is delivered at a pressure below 100 Torr.

Aspect 29. The method of aspect 25, 26 or 27, wherein the reagent gas is a hydride.

Aspect 30. The method of aspect 25, 26 or 27, wherein the reagent gas is arsine or phosphine.

Aspect 31. The method of any one of aspects 26 through 30 comprising delivering the reagent gas to a semiconductor processing device.

Aspect 32. The method of any one of aspects 26 through 30 comprising delivering the reagent gas to an ion implantation device.

What is claimed is:

1. A gas storage and dispensing vessel enclosing an interior volume for holding reagent gas, the vessel comprising:
   a port;
   a valve mounted at the port;
   one or more pressure regulator(s) arranged to maintain a predetermined pressure of reagent gas discharged from the vessel; and
   one or more metal-organic framework adsorbent(s) within the interior volume;
wherein the vessel is configured to be selectively actuatable to flow gas from the interior volume of the vessel, through the pressure regulator(s) and the valve, for discharge of the reagent gas from the vessel, and
wherein the vessel is configured to hold the reagent gas within the interior volume at super-atmospheric pressure, the reagent gas comprising a portion that is adsorbed on the one or more metal-organic framework adsorbent(s) and a portion that is present as condensed reagent gas or gaseous reagent gas in equilibrium with the adsorbed reagent gas.

2. The vessel of claim 1, wherein the one or more pressure regulator(s) is/are located in single or dual-stage configuration at the interior volume.

3. The vessel of claim 1, wherein the one or more of the one or more pressure regulator(s) is/are located in single or dual-stage configuration at the exterior of the vessel.

4. The vessel of claim 1, wherein the one or more metal-organic framework adsorbent(s) has a pore size in a range from 2.5 to 13 angstroms.

5. The vessel of claim 1, wherein the one or more metal-organic framework adsorbent(s) comprises a zeolitic imidazolate framework comprising tetrahedrally-coordinated transition metal atoms connected by imidazolate linkers.

6. The vessel of claim 5, wherein the transition metal atoms are zinc.

7. The vessel of claim 5, wherein the zeolitic imidazolate framework is zinc dimethylimidazolate.

8. The vessel of claim 1, wherein the one or more metal-organic framework adsorbent(s) comprises one or more materials selected from ZIF-8 (zinc dimethylimidazolate), Cu-MOF-74 (copper 2,5-dihydroxybenzenedicarboxylic acid), Ni-MOF-74 (nickel dihydroxybenzenedicarboxylic acid), Mg-MOF-74 (magnesium dihydroxybenzenedicarboxylic acid), MOF-5 (zinc oxo terephthalate), PCN-250(Fe) (iron azobenzene tetracarboxylate), and Cu-BTC(copper benzene-1,3,5-tricarboxylate).

9. The vessel of claim 1, wherein the one or more metal-organic framework adsorbent(s) is combined with another adsorbent comprising a second metal-organic framework, carbon, zeolite, silica gel, or porous organic polymer.

10. The vessel of claim 1, wherein the one or more metal-organic framework adsorbent(s) is in the form of granules, particulates, beads, pellets, disks, blocks, monolith, or space filling polyhedron.

11. The vessel of claim 1, wherein the vessel exhibits a storage capacity of the reagent gas at super-atmospheric pressure that is greater than the storage capacity of the reagent gas in a comparable vessel that has no adsorbent or comprises carbon or zeolite adsorbent instead of the one or more metal-organic framework adsorbent(s).

12. A method of supplying reagent gas from a vessel as recited in claim 1, the method comprising delivering the reagent gas from the vessel interior, to a vessel exterior, the reagent gas being delivered from the vessel at a pressure at or below 5200 Torr.

13. The method of claim 12, wherein the reagent gas is delivered at a pressure below 760 Torr.

14. The method of claim 12, further comprising delivering the reagent gas to an ion implantation device.

* * * * *